I. ACHILLI.
DEVICE FOR FILLING FORMS WITH A DOUGHY SUBSTANCE CONTAINING AIR, AS CHOCOLATE MASS.
APPLICATION FILED MAY 4, 1912.
1,043,790.
Patented Nov. 12, 1912.
2 SHEETS—SHEET 1.
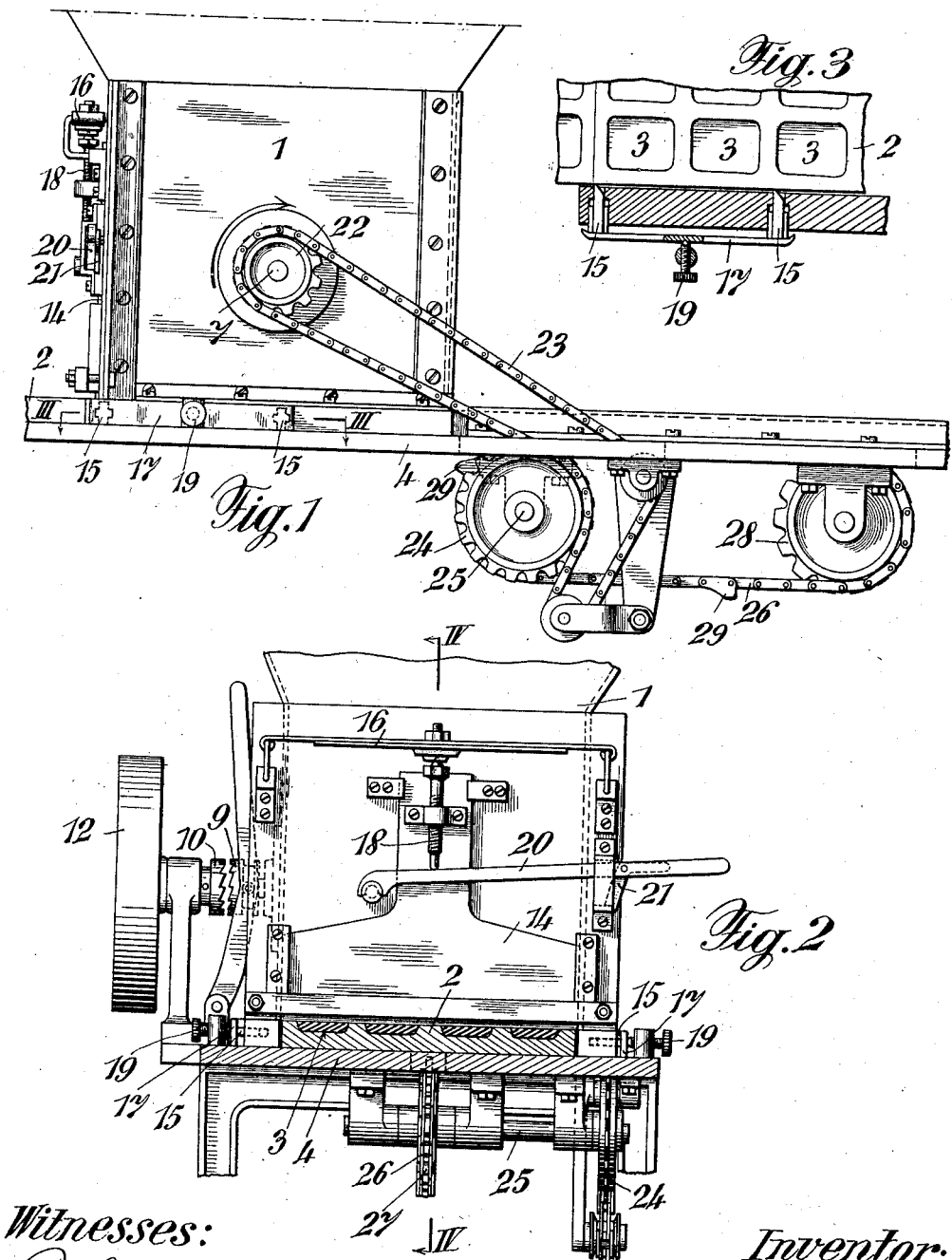

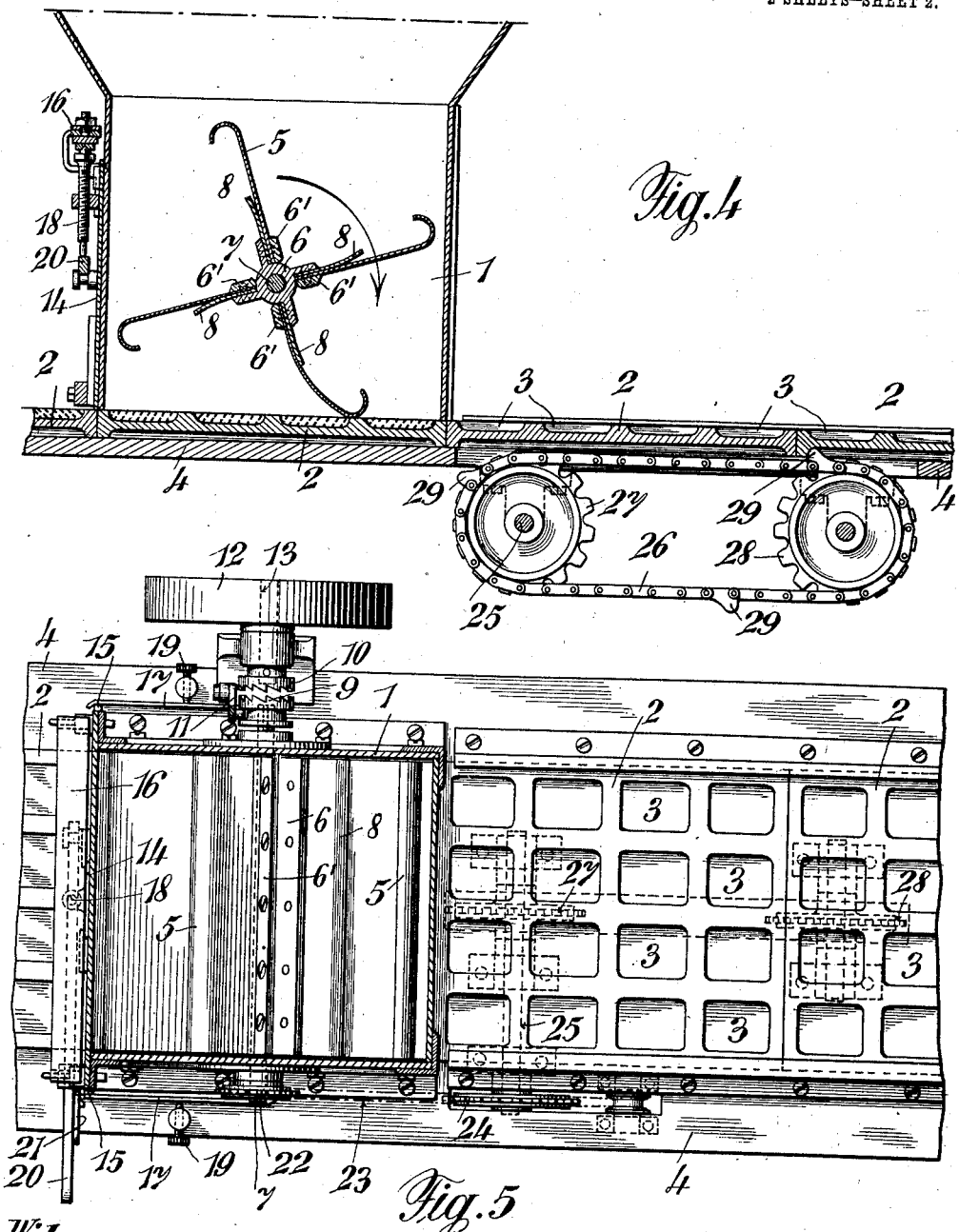

UNITED STATES PATENT OFFICE.

ITALO ACHILLI, OF FULTON, NEW YORK.

DEVICE FOR FILLING FORMS WITH A DOUGHY SUBSTANCE CONTAINING AIR, AS CHOCOLATE MASS.

1,043,790. Specification of Letters Patent. Patented Nov. 12, 1912.

Application filed May 4, 1912. Serial No. 695,229.

*To all whom it may concern:*

Be it known that I, ITALO ACHILLI, a citizen of the United States, residing at Fulton, New York, United States, have invented new and useful Improvements in Devices for Filling Forms with a Doughy Substance Containing Air, as Chocolate Mass; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to a device for filling forms with a doughy substance containing air, as chocolate mass in which pressing means mounted in a receptacle for the mass and completely dipping into the latter press the mass into forms caused to pass below the delivery opening of the receptacle. The devices of this type as hitherto proposed possess the drawback that the acting portions of the rotatable pressing means are located at a relatively large distance above the forms so that they cannot immediately act on the mass in the form but press the mass through openings of a wall arranged between the receptacle and the forms. As a consequence the mass filled into the forms still contains much air so that the forms must be subjected to shaking devices for a long time to remove the air from the mass. This drawback is avoided according to the present invention by applying a wheel provided with wings acting as pressing member which moves faster than the forms, the yielding wings of the wheel sliding on the surface of the forms and pressing the mass so much in the forms that the air is completely removed.

In the accompanying drawing which illustrates by way of example a construction according to this invention, Figure 1 is a side elevation, Fig. 2 is a front view of the same, partly in section, Fig. 3 is a section on line III—III of Fig. 1, showing a detail. Fig. 4 is a section on line IV—IV of Fig. 2. Fig. 5 is a plan view, partly in section.

1 designates the receptacle for the doughy substance as chocolate mass. The receptacle is of rectangular cross section and provided with a funnel on the top and an opening at the bottom. The forms 2 to be filled are provided on the top with hollows 3 for the mass and caused to pass under the receptacle. The receptacle and the forms are mounted on a fixed table 4.

A pressing member is rotatably mounted within the receptacle 1 and provided with four pressing wings 5, which are secured by screws between radial flanges of a nave 6 and plates 6′. The nave is secured to a shaft 7 which is horizontally mounted to turn in the two lateral walls of the receptacle. Stops 8 are secured to the nave. The wings and stops are of the same width as the receptacle 1. The wings are curved at their free ends and made of thin, yielding sheet metal. The shaft 7 is mounted in such vertical distance from the table 4 and the forms 2 that the wings 5 when rotating are caused to touch the forms whereby the wings are bent backward until they are supported by the stops 8.

The rearwardly projecting end of the shaft 7 is provided with a displaceable member 9 of a clutch coupling 9, 10, which member by means of a handle 11 may be brought to engage the member 10. The member 10 of the coupling is secured to the main shaft 13 which is provided with a pulley 12 to which motion is imparted from any suitable source of power. By causing the member 9 of the coupling to engage the member 10 the shaft 7 and the wings 5 are rotated.

At the left side of the receptacle (Figs. 1, 4 and 5), which is the discharge side for the filled forms 2, an upper scraper 14 and two lateral scrapers 15 are provided which are guided on the receptacle and acted on by springs 16 and 17 respectively to be pressed against the upper side and the lateral sides of the forms. The pressure of the springs may be adjusted by means of screws 18 and 19. By means of a lever 20 provided with a latch 21 the slide 14 can be raised against the action of the spring 16. A sprocket wheel 22 secured to the shaft 7 drives a shaft 25 by means of a chain 23 and a sprocket wheel 24. A second chain 26 is mounted on a sprocket wheel 27 secured to the shaft 25 and a sprocket wheel 28. The chain 26 is provided with projections 29 which engage notches in the lower surface of the forms whereby the forms are moved forward.

The device operates as follows: After the receptacle has been filled with chocolate mass the shaft 7 with wings 5 is rotated and the forms are continually passed below the receptacle at a slower speed than the speed of the shaft 7, that is the shaft and the wings are caused to perform at least two or more revolutions in the direction of the arrow (Fig. 4) while a form passes the receptacle. By the rotation of the shaft 7 the wings 5 press the chocolate mass under such pressure into the hollows 3 that the mass is freed from air as much as possible. The air pressed out of the mass can escape either upward between the wings 5 and the receptacle walls or at the side at which the forms move under the receptacle. The filled forms when moving away from the receptacle are freed by the slides 14 and 15 from the exceeding mass which lies on the forms and adheres to the side walls.

By the device described the mass is filled into the forms at a great pressure and the air is removed from the forms as much as possible, so that as compared with the hitherto used methods of filling the forms by hand or by machines without applying pressure, the mass adheres better to the hollows of the forms and is prevented from being raised and removed from the forms by the action of the scraping members 14 and 15. Moreover the time is much shorter than when the forms are subjected to shaking devices, because the small amount of air which still remains in the mass filled in the forms escapes after a short time so that the mass filled in the forms has a smooth surface. Hereby the finished pieces of chocolate obtain a neat appearance and have no hollow spaces caused by bubbles so that they are more uniform.

The described device may not only be used for filling chocolate mass in forms but may also be used to fill any desired doughy mass in forms, which mass is treated in the same or a similar manner as chocolate to produce formed rigid pieces which are as compact as possible and free of hollow spaces.

I claim:

1. A device for filling forms with a doughy mass containing air, comprising a receptacle for the mass, yielding revoluble pressing members adapted to dip into the mass, and forms arranged to be engaged by the pressing members and movable under the latter.

2. A device for filling forms with a doughy mass containing air, comprising a receptacle for the mass, yielding revoluble pressing members adapted to dip into the mass, and forms arranged to be engaged by the pressing members and movable under the latter at a slower speed than the speed of the pressing members.

3. A device for filling forms with a doughy mass containing air, comprising a receptacle for the mass, a rotatable member mounted in the receptacle, yielding wings carried by said member adapted to dip into the mass, forms arranged to be engaged by said wings and movable under the latter at a slower speed than the speed of the rotatable member.

4. A device for filling forms with a doughy mass containing air, comprising a receptacle for the mass, a shaft journaled in the receptacle, a form mounted beneath the receptacle, resilient wings mounted on the shaft adapted to dip into the mass and engage the form, and driving means for the shaft and form adapted to move the latter at a speed slower than the speed of the shaft.

In testimony that I claim the foregoing as my invention, I have signed my name in presence of two subscribing witnesses.

ITALO ACHILLI.

Witnesses:
GUSTAVE ANSERMET,
DUNCAN MACDOUGALL.